United States Patent [19]
Krause

[11] Patent Number: 5,526,520
[45] Date of Patent: Jun. 11, 1996

[54] METHOD TO ORGANIZE AND MANIPULATE BLUEPRINT DOCUMENTS USING HYPERMEDIA LINKS FROM A PRIMARY DOCUMENT TO RECALL RELATED SECONDARY DOCUMENTS

[76] Inventor: Gary M. Krause, 4429 Orion Rd., Lake Orion, Mich. 48035

[21] Appl. No.: 125,021

[22] Filed: Sep. 21, 1993

[51] Int. Cl.⁶ ........................................... G06F 17/30
[52] U.S. Cl. .................. 395/600; 395/161; 364/419.19; 364/223.6; 364/237.82; 364/254.6; 364/275.6; 364/282.1; 364/283.3; 364/283.1; 364/920.2; 364/920.7; 364/DIG. 1; 364/DIG. 2
[58] Field of Search ...................... 395/600, 145, 395/146, 155, 156, 160, 161; 364/419.19, 223.6, 223.7, 237.82, 254.6, 275.6, 282.1, 283.3, 283.1, 920.7, 920.2

[56] References Cited

U.S. PATENT DOCUMENTS

| | | | |
|---|---|---|---|
| 4,748,678 | 5/1988 | Takeda et al. | 395/145 |
| 4,885,694 | 12/1989 | Pray et al. | 364/464.01 |
| 4,941,125 | 7/1990 | Boyne | 395/600 |
| 4,954,969 | 9/1990 | Tsumura | 395/160 |
| 4,964,060 | 10/1990 | Hartsog | 364/512 |
| 5,075,873 | 12/1991 | Seki et al. | 395/140 |
| 5,189,606 | 2/1993 | Burns et al. | 364/401 |
| 5,220,648 | 6/1993 | Sato | 395/146 |
| 5,297,249 | 3/1994 | Bernstern et al. | 395/156 |

OTHER PUBLICATIONS

Danuloff, *The System 7 Book*, 1991, pp. 201–217, Ventana Press.

Primary Examiner—Thomas G. Black
Assistant Examiner—Jack M. Choules
Attorney, Agent, or Firm—Howard & Howard

[57] ABSTRACT

A method for organizing and relating several documents, including graphic documents, allows the storing of documents in a plurality of files, and thereafter identifying specific ones of those files with a project, such as blueprint documents for the construction of a building. Documents associated with a project are related in that they may include a primary or general document, such as a general view blueprint, and secondary documents, such as detailed drawings of the primary document including sectional or end views. The secondary documents may also include textual and function files. The files are linked to one another by placing hotspots on a primary document which automatically calls up a secondary document. The hotspot is visually indicated on the primary document with a name which indicates the file of the secondary document. There may be a plurality of documents or drawings within one page file. A specified document or drawing can be identified by designating its coordinates, scale and calling file in a separate file which can be used as a hotspot.

3 Claims, 6 Drawing Sheets

METHOD TO ORGANIZE AND MANIPULATE BLUEPRINT DOCUMENTS USING HYPERMEDIA LINKS FROM A PRIMARY DOCUMENT TO RECALL RELATED SECONDARY DOCUMENTS

TECHNICAL FIELD

The invention relates to a computer based system and method for processing and organizing building plans or blueprint drawings. More specifically, the invention relates to the linking of detail drawings associated with a general drawing, and the automatic display thereof by actuating defined points on the general drawing.

BACKGROUND OF THE INVENTION

It is common in the industry of building construction, that architects or other design personnel draw up construction blueprints or plans either by hand or on a computer aided design (CAD) system. Such blueprints or working drawings include a general or primary plan drawing with supporting pages of detailed, secondary drawings supplementing and referencing the primary building drawing, i.e., floor plans, sectional, etc. The detailed drawings provide more specific information for various portions or areas from the primary plan drawing. For bidding and estimating on a project, a single company distributes rolls of microfiche of the blueprint drawings or building plans in their entirety. Selective drawings of specified plans on the microfiche are then viewed to provide estimate proposals thereon. Though a contractor may be interested in only one particular portion of the building, the contractor must search through all the plans in order obtain the drawings for the particular portion. Obviously, this type of system provides for difficulty in handling the drawing and consumption of time in flipping through all the drawings.

It has been known in the art to input information into a computer for cost estimating analysis and reporting. Common computer systems may provide costs of material and provide reports thereof based on construction information specifically put into the computer. An example of such capability is illustrated in U.S. Pat. No. 5,189,606, issued Feb. 23, 1993 in the name of Burns et al.

U.S. Pat. No. 4,964,060, issued Oct. 16, 1990 in the name of Hartsog discloses a building test system which reviews building plans in view of required standards, such as zoning codes and regulations. U.S. Pat. No. 4,885,694, issued Dec. 5, 1989 in the name of Pray et al discloses an automated building control design system. The system is a computer base system for substantially automating the designs of a building control system, such as electronics, heating, etc.

None of the prior art systems allow the manipulation of blueprint drawing plans in existence by automatically and electronically referencing the detail drawings associated with particular locations of the primary drawing.

SUMMARY OF THE INVENTION

The invention includes a method and supporting system for organizing and relating a plurality of documents including graphic drawings. The method and system includes the steps of storing a plurality of documents including graphic drawings in a plurality of files, selectively displaying the documents, identifying a hotspot on a primary document for further definition, identifying a secondary document in a file different from the primary document, and linking the hotspot with the secondary document so that activation of the hotspot on the primary document causes display of the secondary document.

Also included is a method of creating the secondary documents which includes the steps of electronically copying and storing a single page having a plurality of graphic drawings in a single file, selecting and identifying one of the graphic drawings in the single file, and associating a name with the selected graphic drawings.

BRIEF DESCRIPTION OF THE DRAWINGS

Advantages of the present invention will be readily appreciated as the same becomes better understood by reference to the following detailed description when considered in connection with the accompanying drawings wherein.

DESCRIPTION OF THE PREFERRED EMBODIMENT

Figure 1:
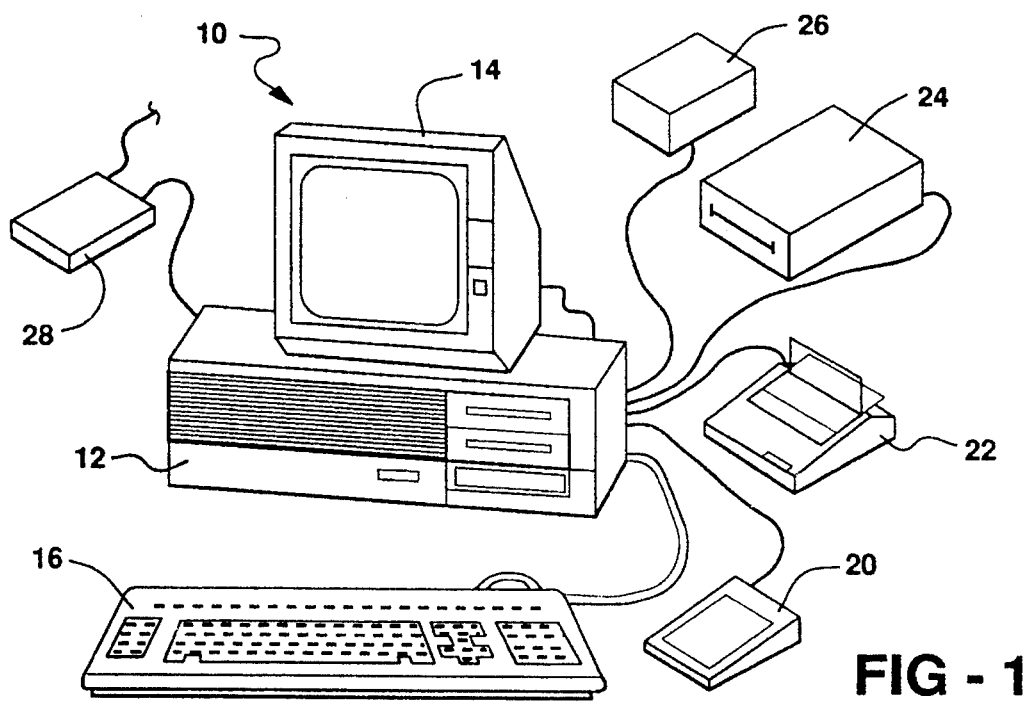
FIG. 1 is a block diagram of the system of the subject invention.
Figure 2:
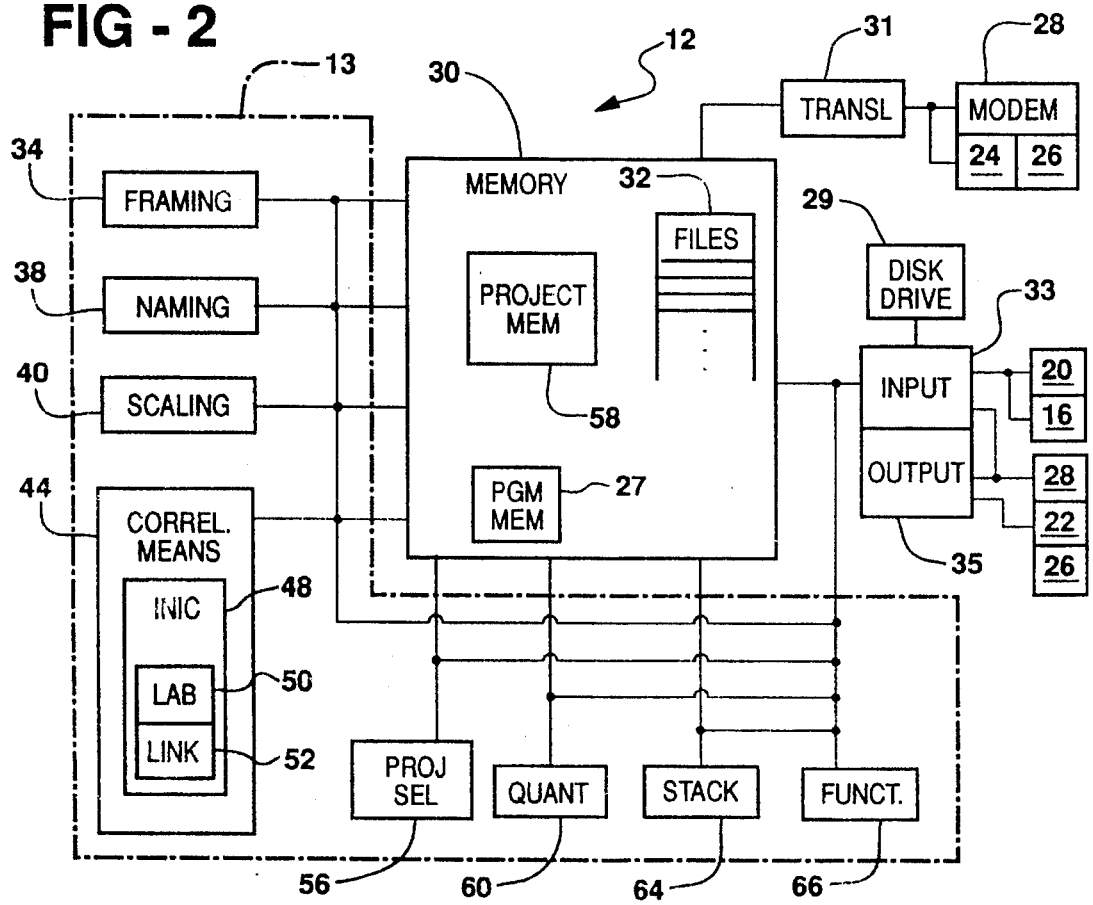
FIG. 2 is a block diagram of the controller of the subject invention.

An electronic filing and manipulation system is generally illustrated at 10 in FIG. 1. The system 10 includes a controller means 12 with display means 14 and selection means 16. The display means 14 generally comprises a CRT monitor as commonly known in the art. The selection means 16 comprises a standard computer keyboard 18 and a remote control mouse 20, both connected to the computer 12 as known in the art. The selection means 16 allows for input of information and selection of functions as subsequently discussed. The controller means 12 may be comprised of a typical computer. It is to be understood that other types of equivalent components may be utilized, such a pen sensitive display in place of a CRT unit.

The filing system 10 also includes auxiliary components which may be attached in typical computer fashion. Such auxiliary components may include a printer 22, scanner 24, and a video/audio player 26. The auxiliary components may also include an external communication device 28, typically a modem or other communication device, for communicating with other computers or auxiliary devices.

In the preferred embodiment, the invention relates to the manipulation of building designs or blueprint drawings with the overview or general elevational plan drawing herein referred to as the "primary document" and the detail drawings supporting that primary document entitled the "secondary documents". Typically, the sets of blueprint drawings include graphic drawings with text supporting same and specifications. It is to be understood that the invention may be applicable to other types of systems with various documents.

The blueprint drawings are either scanned in by the scanner 24 or copied electronically. The drawings copied electronically may be communicated through the modem 28 or external device, or by copying a computer disk by disk drive 29. Furthermore, the system 10 is capable of receiving CAD drawings either by modem 28 or electronic copying, or software creations within the computer 12. The system 10 includes translation means 31 for receiving the blueprint drawings in any electronic form described above, i.e., from various operating systems, and for converting same into useable form for the subject system 10. The subject system 10 may operate in any of the following operating systems, or any other system: OS/2®, Windows®, Windows NT®, etc. The translation means 31 includes software generally available to convert document formulas between programs and operating systems.

The controller means 12 includes input means 33 for receiving input from the keyboard 16 and mouse 20 to communicate and operate the necessary commands. The controller means 12 also includes output means 35 for formulating the display output to the printer 22, modem 28, and video/audio player 26. The input 33 and output 35 means are generally standard computer components which allows communication of signals in various forms between equipment.

The controller means 12 includes processor means 13 for performing the necessary operations and functions in conjunction with the external devices, and communicates with the input 33 and output 35 means, as subsequently discussed. The processor means 12 comprises a typical computer processor which operates with a software program stored in memory 30, as subsequently defined and discussed.

The controller means 12 includes memory means 30 for storing a plurality of documents in a plurality of files 32. The documents may comprise the blueprint graphic drawings, text information, and instructional information as subsequently discussed. In the preferred embodiment, each page of the standard blueprint drawings is equivalent to a page or software file 32 in the memory 30. Therefore, each page is electronically transferred into the memory 30 as an individual file. It is typical that a detail page may have two or more detailed graphic drawings thereon, which will be uniquely handled, though the entire page is stored as a single file 32. In conjunction with the processor means 13, the documents are stored in memory 30 in the typical manner. A program memory 27 stores the software program for the processor means 13.

Each page file 32 within the memory means 30 may include a plurality of documents therein, i.e., several individual drawings. Each document may be independently identified. The processor 13 includes framing means 34 for electronically identifying a selected document from a page file having a plurality of documents, and separately identifying same as a separate file. For example, a blueprint page file may have several detail drawings thereon. The framing means 34 allows an operator to designate a specific drawing as a frame 36 and create a frame file therefor.

More specifically, the framing means 34 allows the page file to be displayed on the display means 14, and use of either the keyboard 16 or the mouse 20 (cursor) allows the user to block a particular document or drawing therein. The operator graphically clicks or actuates with the mouse 20 and moves same to move the cursor about a desired drawing or frame on the page file which indicates same as the selected frame 36.

Naming means 38 allows the selected frame 36 to be specifically identified by a name as a file, which is then stored in memory 30. Upon the selection of a frame 36 within a page file, the operator inputs a frame name therefore and the naming means 38 will create a new file in memory 30 with the frame name. The frame file will include the coordinates of the frame 36, and the name of the page file in which it is contained. Further information may be associated therewith.

Figure 6:
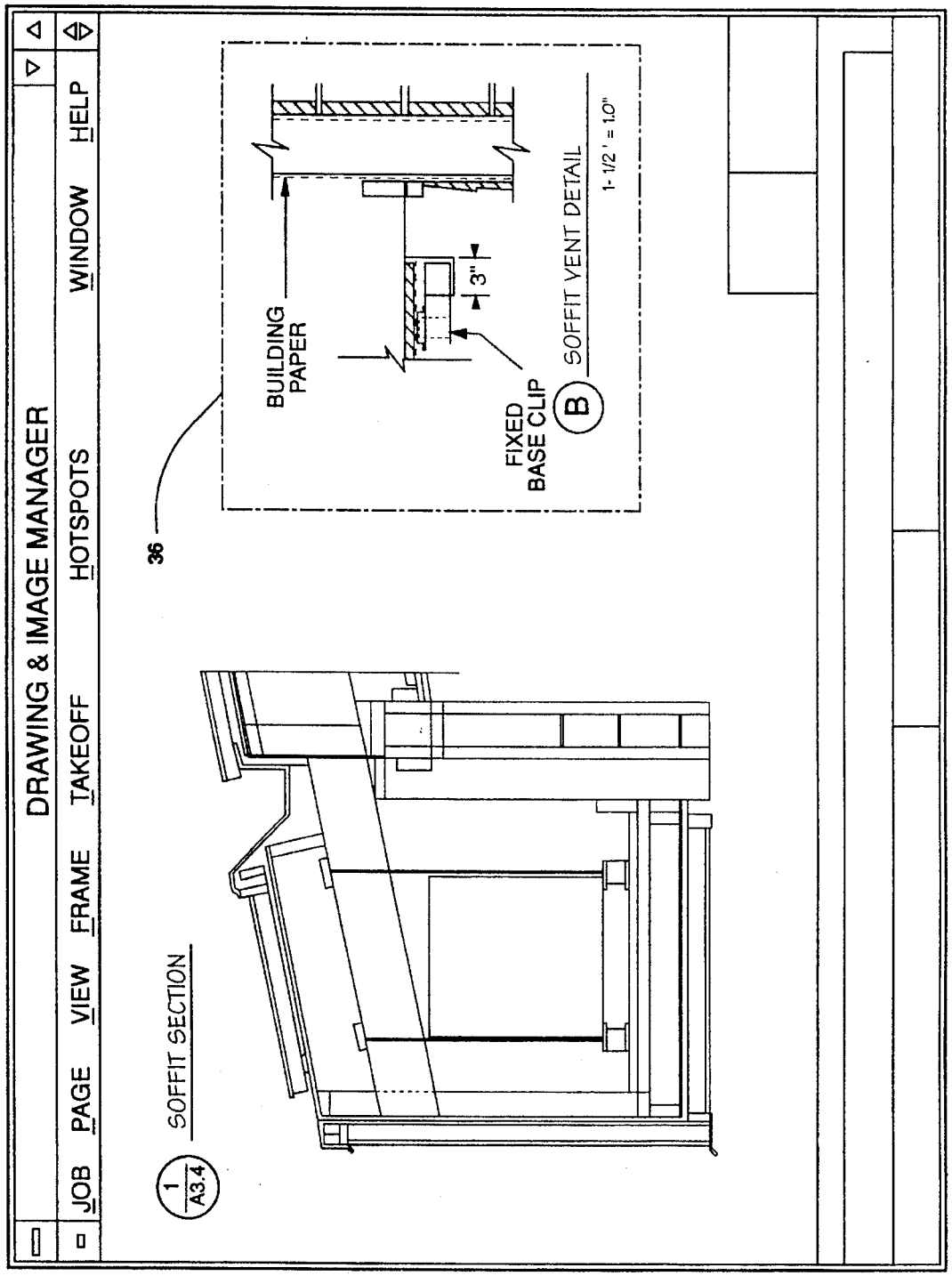
FIG. 6 illustrates a display of a secondary document file with framing.

The processor 13 includes scaling means 40 for storing information regarding the measurement scale of the selected frame 36 for each frame file 32. In other words, once the frame 36 within a page file is created, a specified scale may be associated therewith, which may be different from any other frame or drawing on that particular page file. Each frame 36 on a page or in a file will have its own scale identifiers which is also stored in the frame file (FIG. 6). The frame file may store the actual document or drawing. Alternatively, the frame file may store the page file and coordinates of the frame.

Other types of files may be created and stored with a project. Such files include text files and audio/video files. The primary document may include text information thereon. Additional text information may be entered in a text file, which can be accessed by the primary document with hotspots as subsequently discussed. A hotspot may activate an audio/video function which, when activated, actuate the audio/video device 26 to either play an audio or video which provides further detailed information. The audio/video files and functions are commonly known in the art.

The processor 13 also includes correlating means 44 for identifying a hotspot or point on a document, and calling up a secondary document from the memory means 30 associated with the hotspot to provide further information to the operator. In other words, on the primary document, a hotspot may be indicated thereon which will identify different information or a drawing, i.e., a sectional, end view, or text, etc. A reference indicator 46 as the hotspot is placed on the primary document which references the secondary document and can automatically call-up a page or frame file, or other type of file for display or execution (video/audio).

More specifically, the correlating means 44 includes indicating means 48 for placing a visual indicator 55 on the primary document as the hotspot. In other words, the operator can cause to be placed the visual indicator 55 at any location on a document for association with a secondary document in order to provide additional detail information therefor. The visual indicator 55 generally includes a name which is a name of a secondary file within a symbol.

The indicating means 48 includes labeling means 50 which places a name and label at the hotspot 55 which identifies the secondary document by file name. It is to be further understood that a secondary or detail document may act as the primary document so that it may include a hotspot 55 which references a different secondary document for call-up.

The indicating means 48 also includes linking means 52 for displaying the secondary document when the hotspot 55 is activated. Activation of a hotspot 55 occurs by clicking or actuating the hotspot 55 by the mouse/cursor 20, or using the keyboard 16 with cursor/enter. The linking means 52 accesses the name of the secondary document in the hotspot 55 to call up the secondary document. The secondary file is identified by the name in the hotspot 55, and the processor means 13 automatically displays the secondary document upon activation of the hotspot 55. It is to be understood that the secondary document may be comprised of either graphic drawings or text, or may cause other external devices to be activated. The secondary document identified by the hotspot 55 is placed on top of the primary, calling document on the display screen 14, as subsequently discussed.

In order to limit the number of working files referenced and accessed at a time, the system 10 includes project selection means 56 for storing a project or job with text information and selected blueprints or drawings therefore. In other words, a user may select a limited number of specific blueprint drawing files to be used in and associated with a project such that when selecting a project, only certain files will be used therewith. The memory means 32 includes a project memory 58 for storing each separate project therein by project name. The project memory 58 will be comprised of at least a primary document and several secondary documents referenced by file name, along with any other types of documents as desired by the operator.

Also included in the processor means 13 is a quantitative means 60 for providing the approximate dimensions of a blueprint drawing, and for providing a quantity of materials necessary for constructing same. The mouse 20 or cursor is utilized to outline the perimeter of an area or shape of the building in the drawing. Thereafter, the quantitative means 60 will calculate the size and dimensions of the outlined area dependent on the scale associated therewith. This information may be saved in memory and is displayed on the display 14. From this information, pricing and materials may be determined.

In addition to the above described features, pricing and reporting may be accomplished by software, as commonly known in the art.

Figure 5:
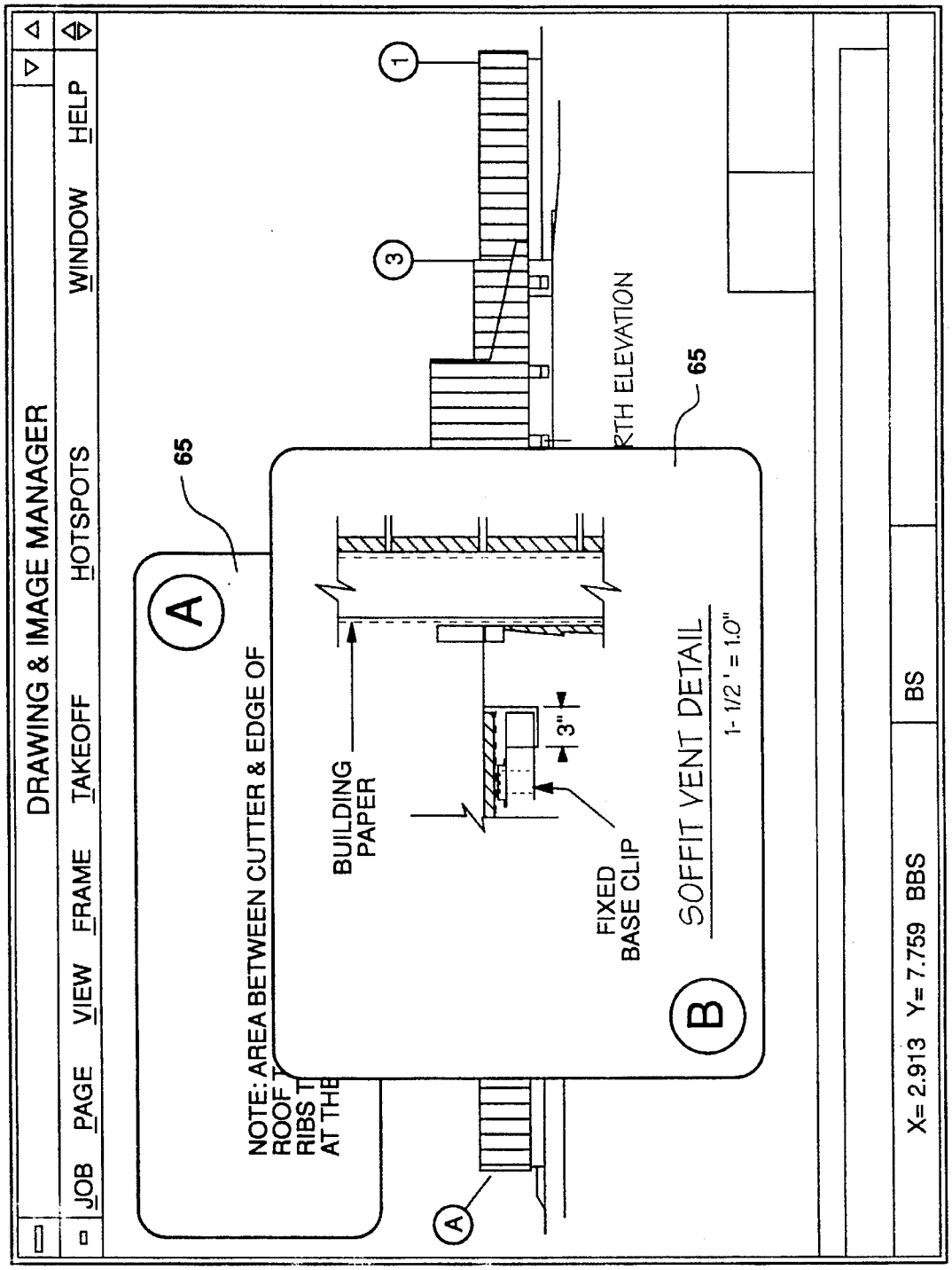
FIG. 5 illustrates the display of a primary document including secondary documents in windows.

The processing means 13 includes stacking means 64 for displaying the primary documents fully on the screen 14 with any secondary documents stacked in cascade manner on top thereof upon activation of the hotspots 55. In other words, when the primary document is first called up by the operator, the primary document is displayed on the entire screen 14. However, when a hotspot 55 is activated, the linked or secondary document is displayed in a window 65 over the primary document, generally in a less than full view, as illustrated in FIG. 5. The secondary document may thereafter be exited in order to have the original, primary document again fully displayed without any windows thereover. Multiple windows 65 may be stacked in cascade manner. Alternatively, the windows 65 may be placed in a "tile" configuration, as commonly known in the art.

The processor means 13 also includes function means 66 for displaying a tool or function bar 70 across the top of the display screen 14 to allow various functions to be performed by the operator. Such functions may include the following: JOB, PAGE, VIEW, FRAME, TAKE-OFF, Hotspots, WINDOW. Any other types of functions may be added to provide for additional features of the invention. The JOB function allows the association of the files with a job or project. The PAGE function allows the identification of pages to be identified with a project. The VIEW function allows change in the view which is presently displayed on the screen 14. The FRAME function allows framing or identification of a single drawing or document on a multiple drawing page. The TAKE-OFF function allows for a drawing to be quantitized. The Hotspot function allows for the creation and modification of hotspots. The WINDOW function allows for windows showing secondary documents to be varied. The functions will be more specifically defined in the following description of the method of the subject invention. Activation of a function is commonly known in the art.

Figure 3A:
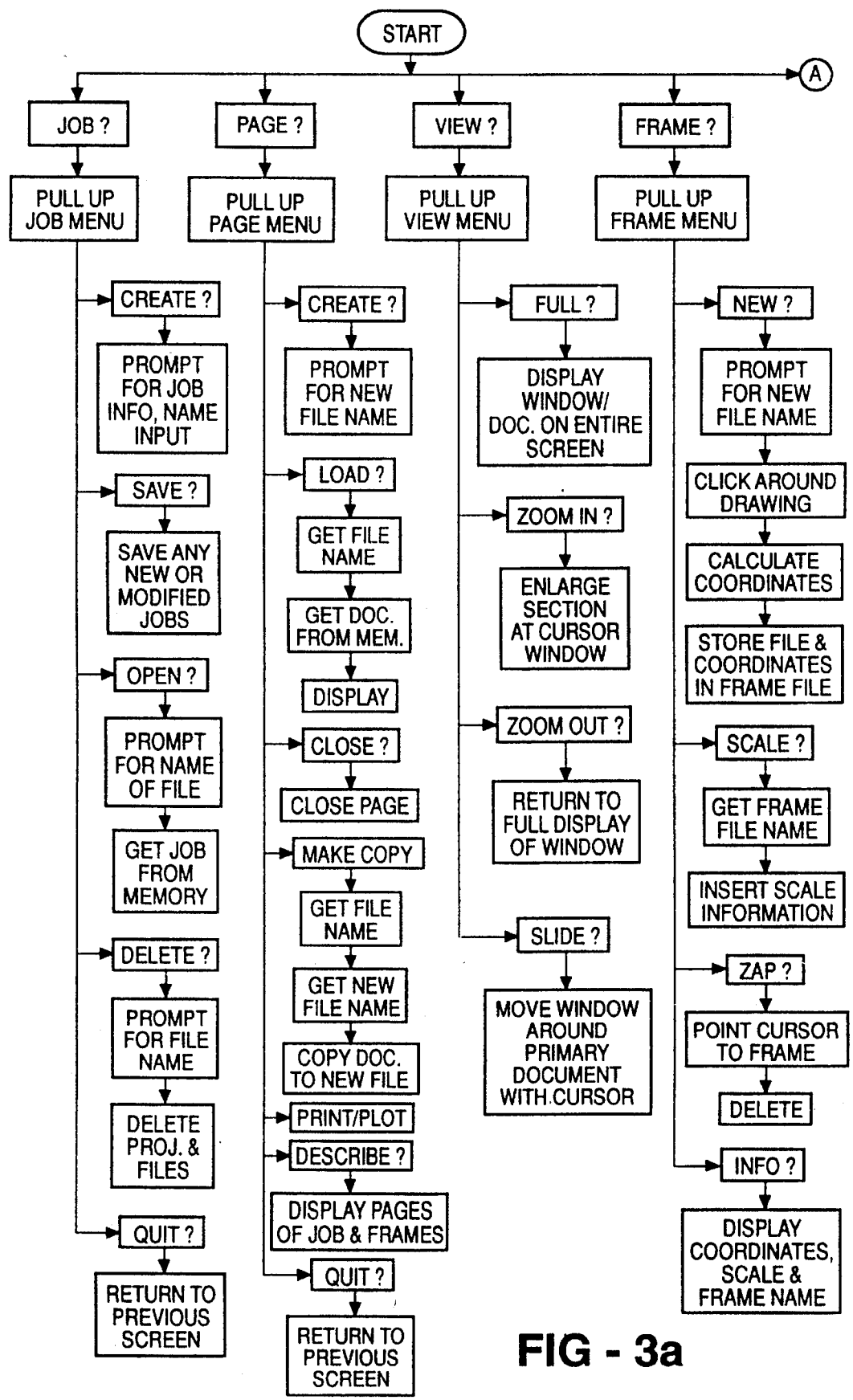
FIGS. 3 a–b area flow chart of the controller.
Figure 3B:
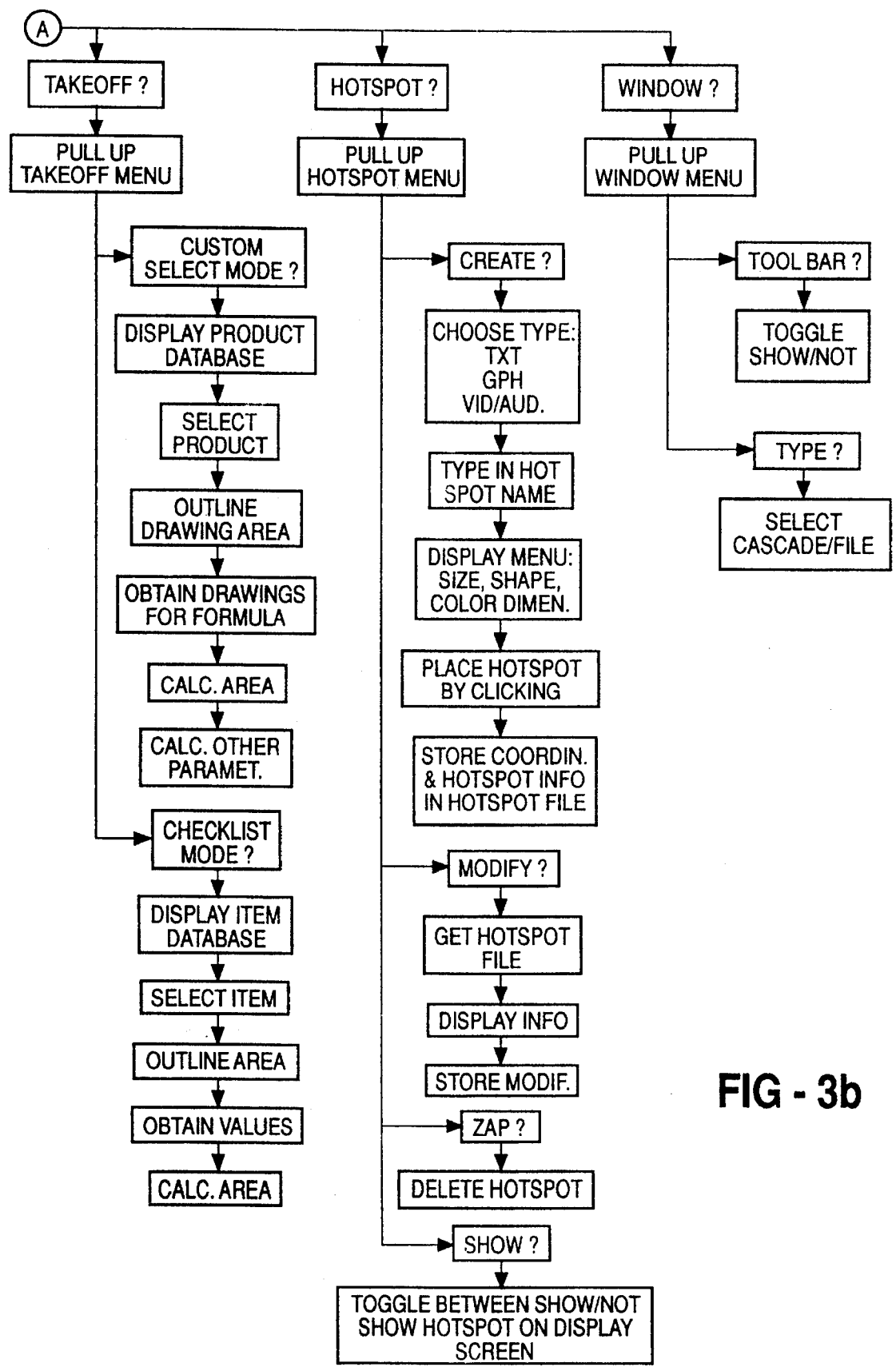

The method of organizing a plurality of documents including graphic drawings is outlined in the flowchart of FIGS. 3 *a–b* and implemented by a software program stored in the program memory 27.

The documents for blueprint images are stored in the files 32 of the memory 30. The blueprint images may be either scanned in or copied electronically either by disk drive 29 or modem 28. Alternatively, a CAD file may be utilized to provide the electronic blueprint drawings directly on the system 10 or copied. Each hard-copy of the blueprint drawing sheets or pages is copied as a separate file 32 in memory 30, and may be named as indicated on the page.

Thereafter, a project is initiated and a job file is created by actuating the JOB function. The job file in project memory 58 holds all information about a job, including its geometric model, page layouts, price reports, etc. The job file consists of the job name; description of the job; client information including name of the contact person, phone number and address; contract information including name, contact person, phone number and address; job date; industry; page description for containing a description for each page of the job; etc. These items may not be included in the job file but may reference other, separate files while the job file only holds the file name.

When the JOB function is executed, a window menu is displayed on the screen 14 which displays the subfunctions: OPEN, CREATE, SAVE, DELETE and QUIT. When the OPEN subfunction is activated, the operator is prompted to type in an existing project name so that the system 10 will be operating therein. When the CREATE function is executed, a menu is displayed which allows for a new project name to be entered and project information thereafter. When the DELETE function is executed, the name of the project is requested and is thereafter be deleted with all associated files. The SAVE function saves the job entered with the CREATE or OPEN subfunctions, and any changes made therein. The QUIT subfunction quits the job menu. Other functions may be utilized in combination with the JOB function including such common computer functions as move, rename, etc.

The PAGE function moves files and associates same with a project or job, or calls up a page for use. Once all of the blueprint drawings are entered, the operator may select blueprint drawings from a directory of all of the input files. Selected pages will be identified with the previously opened or created job. Either the actual files may be moved to a subdirectory for the project, or merely the identification of files may be associated with the project. In the preferred embodiment, the file names are included in the job file. Thereafter, this project information is saved.

The PAGE function when activated pulls up a menu which includes the following subfunctions: CREATE, LOAD, CLOSE, MAKE COPY, PRINT, PLOT, DESCRIBE, QUIT. The CREATE function will create a new file for a page. The LOAD function will load the page file which is input by the operator as the document displayed on the screen 14. The MAKE COPY will copy an existing page file and provide a new name for the new copy to be input for the project. The PRINT and PLOT functions will output the page file on the display 14 to the printer 22 or other external. The QUIT function puts the user back to the previous display screen. The DESCRIBE function pulls up textual information regarding a description of the job or project and files associated therewith, and allows same to be modified.

Frames may be created within the page files of the stored documents by using the FRAME function. The FRAME function includes the subfunctions of NEW, ZAP, SCALE, MOVE and INFO. First, a page is chosen for frame creation by the PAGE function. The NEW subfunction is activated which allows naming of a frame (frame file) and designation of a frame on the displayed page. The operator selects the area and clicks around the area with a mouse 20 to define the area of the frame 36. The coordinates thereof are calculated and stored in the frame file. The SCALE subfunction can be activated if a new scale must be added for the particular frame. The INFO subfunction allows you to click on a frame to display the information of scale, page, coordinates, etc. This process may be continued for any number of frames 36 within one page and with each page within a project. The ZAP subfunctions allows deleting a frame 36 by moving the cursor thereon.

Thereafter, hotspots 55 may be defined associated with particular page files or frame files, or any other type of file. In order to define a hotspot 55, a primary document is first selected by the PAGE function and displayed on the screen 14.

Thereafter, hotspots 55 may be placed on the primary document, the hotspots 55 being previously defined as either the page files or frame files, or any other type. The HOTSPOT function is activated. The HOTSPOT function when activated will pull a new menu onto the screen when lists the subfunctions: CREATE, MODIFY, ZAP, SHOW, ENABLE. The CREATE subfunctions allow creation of a new hotspot on the displayed document. The MODIFY function allow modification of an existing hotspot, i.e., moving to a different location, renaming, etc. The ZAP subfunction deletes a hotspot 55. The SHOW subfunction allows selection of whether or not to display the hotspots 55 on the screen 14.

Upon activation of the CREATE subfunction, a menu is displayed to allow selection of the type of document and file, i.e., text, graphic, audio, video. Once selected, the name or file of the hotspot 55 is input, the file name being previously defined and stored in memory 30 when creating the frame or naming the page. Thereafter, a menu for selection of the size, shape and color of the hotspot 55 is displayed to have the operator select the visual indication. Thereafter, the operator is prompted to place the hotspot 55 by moving the cursor and activating. Thereafter, additional hotspots 55 may be placed on the document. It is also to be understood that hotspots 55 may be placed on secondary documents which reference other secondary documents. Hotspots 55 which are entered on documents will be stored in a linked hotspot file so that upon display of the document, the hotspots 55 will be displayed when the SHOW is enabled.

With regard to the quantities of portions of the drawings, the TAKE OFF function is activated. The TAKE OFF function allows a defined perimeter or area of a building drawing in the file to be outlined for automatic calculation of the dimensions thereof, to be subsequently used to determine costs and material quantities. The information may be put into standard software packages which allow for costs analysis. The subject software provides information of dimensions to the cost analysis program.

Upon execution of the TAKE OFF function, a menu is displayed for selection of CUSTOM SELECT or CHECKLIST modes. In the CUSTOM SELECT mode, a product database is displayed for selection of a specific product. The product database is stored in memory 30 and provides a list of products by commercial name and costs, such as:

| DESCRIPTION | MANUFAC-TURER | PRICE |
| --- | --- | --- |
| Paint - Doors and Frames | De Sota | 12.49 |
| Paint - Handrails | Lucile | 18.71 |
| Painting - Masonary - | Pittsburgh | 192.47 |

| DESCRIPTION | MANUFAC-TURER | PRICE |
| --- | --- | --- |
| Low |  |  |
| Painting - Masonary - | Pittsburgh | 63.00 |
| Medium |  |  |
| Paint - Windows | De Sota | 72.00 |
| Flexible Wood Veneer | Sherwin Williams | 36.00 |
| Special Coating | Sherwin Williams | 28.56 |
| Trim - Painted | Sherwin Williams | 881.00 |

Once a product is selected, then the take off is performed wherein the user outlines an area of the drawing. The outlining is performed by clicking from corner to corner with straight lines being automatically drawn between consecutive clicked corners. Once an area is closed, the program calculates the area based on the scale and displays and stores same in memory. Any values not provided from the takeoff or in memory will be prompted by a menu for input by the operator. For example, if the item of stud wall is selected, the file holds that the take off unit is linear feet and the takeoff formula is length×height×width. The values of height and width may be required to be input if unobtainable from the takeoff. The file for stud wall includes multiplication factors to be multiplied with the calculated area to provide additional information: labor productivity (×0.08), labor rate (×26.00), material conversion (×0.015), material unit (bd ft), material price (×97.00), waste % (×7.00), equipment productivity (×0.0628), equipment rate (×2.20), sales unit price, other unit price. The values may be adjusted based on a particular grade or manufacture of selected item or product. The quantity of the product and the approximate cost is also calculated from the selected product information.

In the CHECKLIST mode, a pre-configured item list is displayed for selection, i.e., roof, walls, floor, etc. Once an item is selected, takeoff may be performed as in the SELECT mode to outline the relevant area. The item will designate a formula for determining the dimensions thereof based on the information from the takeoff. If any information is necessary additional to that obtained from the drawing, a prompt for the information is displayed requesting input thereof. The formulas are the same as described in the previous mode, though include only average costs and material costs may be excluded. The operator is prompted to actuate the mouse 20 and move the cursor about the area for which dimensions are to be calculated. Once completed, the program calculates the dimensions in view of the assigned scale, and displays the information.

The screen function allows an operator to access the information presently displayed on the screen the subfunctions include make copy, print, plot, describe, quit. The make copy subfunctions allows a copy to be made of the screen display and input into the file. The print allows the screen to be printed to a printer, as does the plot function. The describe functions allows for the description of that which is displayed on the screen which is stored in the file. The quit function allows the menu to be removed and go back to the general menu.

The VIEW function allows a frame or secondary document to be adjusted in dimension as an overlay or window 65 over the calling or primary document. The VIEW function includes the subfunctions of: FULL, ZOOM IN, ZOOM OUT, SLIDE. The FULL subfunction allows the secondary document to be displayed fully on the screen 14. The ZOOM IN subfunction allows an area of the document to be exploded in the window 65. The ZOOM OUT subfunction resumes the original window display. The SLIDE subfunction allows the window 65 to be moved in an overlay fashion anywhere about the primary document.

The memory means may store the project information in either CD-ROM or magnetic media. Typically, any standard 386 computer systems may run the subject system 10.

Figure 4:
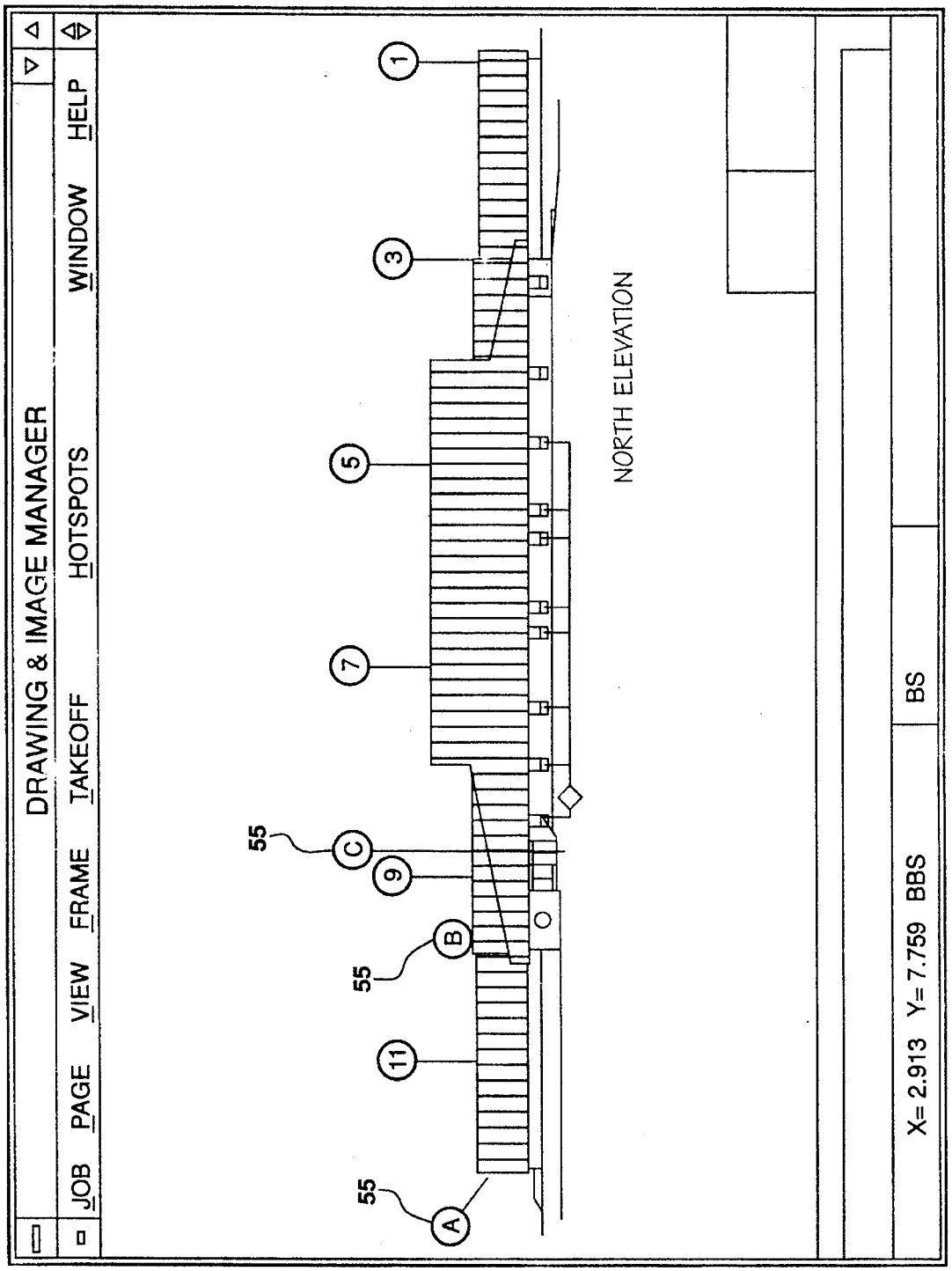
FIG. 4 illustrates the display of a primary document with hotspots.

As an example of the system, an elevational view is illustrated in FIGS. 4–5 as displayed on the display 14 with the function bar therealong. This may be considered the primary document which includes a north elevation view. Located on these drawings are four hotspots: A, B, C, and numbered hotspots. The "A" hotspot will call up a textual description which is in a note or text file named A in memory 30 as illustrated in FIG. 5. Subsequent activation of the hotspot "B" will call up the B file and display same in a cascade fashion on the computer screen as in FIG. 5. The B file may be a sectional view as is illustrated. Thereafter, each of these documents may be exited in order to return and display the full primary document as in FIG. 4.

FIG. 6 illustrates the designation and blocking of a frame 36 from a secondary document.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A method of organizing and relating a plurality of documents including graphic drawings such as architectural drawings, the method including the steps of:

storing a primary document including a primary graphic drawing representative of an object in a primary file;

storing a secondary document including a plurality of secondary graphic drawings in a secondary file, each of the secondary graphic drawings further defining a portion of the object represented by the primary graphic drawing;

selectively displaying the primary and secondary documents;

defining a frame file of the secondary file by isolating one of the plurality of secondary graphic drawings from the other secondary graphic drawings;

assigning a measurement scale to the one secondary drawing in the frame file;

identifying a hotspot on the primary document for further definition;

linking the hotspot with the frame file so that activation of the hotspot on the primary document causes display of the frame file without displaying the remaining portions of the secondary document so that analysis can be performed using the assigned measurement scale of the one secondary graphic drawing in the frame file; and wherein said storing of the primary document includes electronically scanning a blueprint drawing page and said storing of the secondary document includes electronically scanning a different blueprint drawing page.

2. A method as set forth in claim 1 further including assigning a name to the hotspot and assigning the same name to the frame file.

3. A method as set forth in claim 2 further including displaying the frame file with the name of the hotspot.

* * * * *